United States Patent

Winkelmann

[11] 4,069,454
[45] Jan. 17, 1978

[54] TRANSMITTER-RECEIVER EMPLOYING AUTOMATIC CHANNEL HUNTING AND SELECTION

[75] Inventor: Heinz Winkelmann, Pforzheim, Germany

[73] Assignee: International Standard Electric Corporation, New York, N.Y.

[21] Appl. No.: 670,285

[22] Filed: Mar. 25, 1976

Related U.S. Application Data

[63] Continuation of Ser. No. 552,638, Feb. 24, 1975, abandoned.

[30] Foreign Application Priority Data

Feb. 27, 1974 Germany .............................. 2409375

[51] Int. Cl.² ............................................. H04B 1/40
[52] U.S. Cl. ...................................... 325/25; 325/55; 325/470; 343/179
[58] Field of Search ........................ 325/21, 22, 25, 26, 325/53, 55, 57, 64, 302, 345, 432, 433, 439, 470; 340/147 R, 147 SC, 171 R, 408, 224, 311–314; 343/176–180

[56] References Cited

U.S. PATENT DOCUMENTS

| 3,426,279 | 2/1969 | Berman | 343/179 |
| 3,443,228 | 5/1969 | Brenner et al. | 343/179 |
| 3,535,636 | 10/1970 | Muilwijk | 325/55 |

*Primary Examiner*—Robert L. Griffin
*Assistant Examiner*—Jin F. Ng
*Attorney, Agent, or Firm*—James B. Raden; William J. Michals

[57] ABSTRACT

A transmitter-receiver is disclosed for multichannel systems wherein a search for an idle channel is carried out with the help of a second intermediate frequency which is modulated with the station's own call number or with a call number not otherwise used in the system and which is injected into the receiver portion. If, during the channel search, a selective call receiver, adjusted to this call number, responds, the channel is determined to be idle because the additional IF voltage is higher than the IF noise voltage.

5 Claims, 1 Drawing Figure

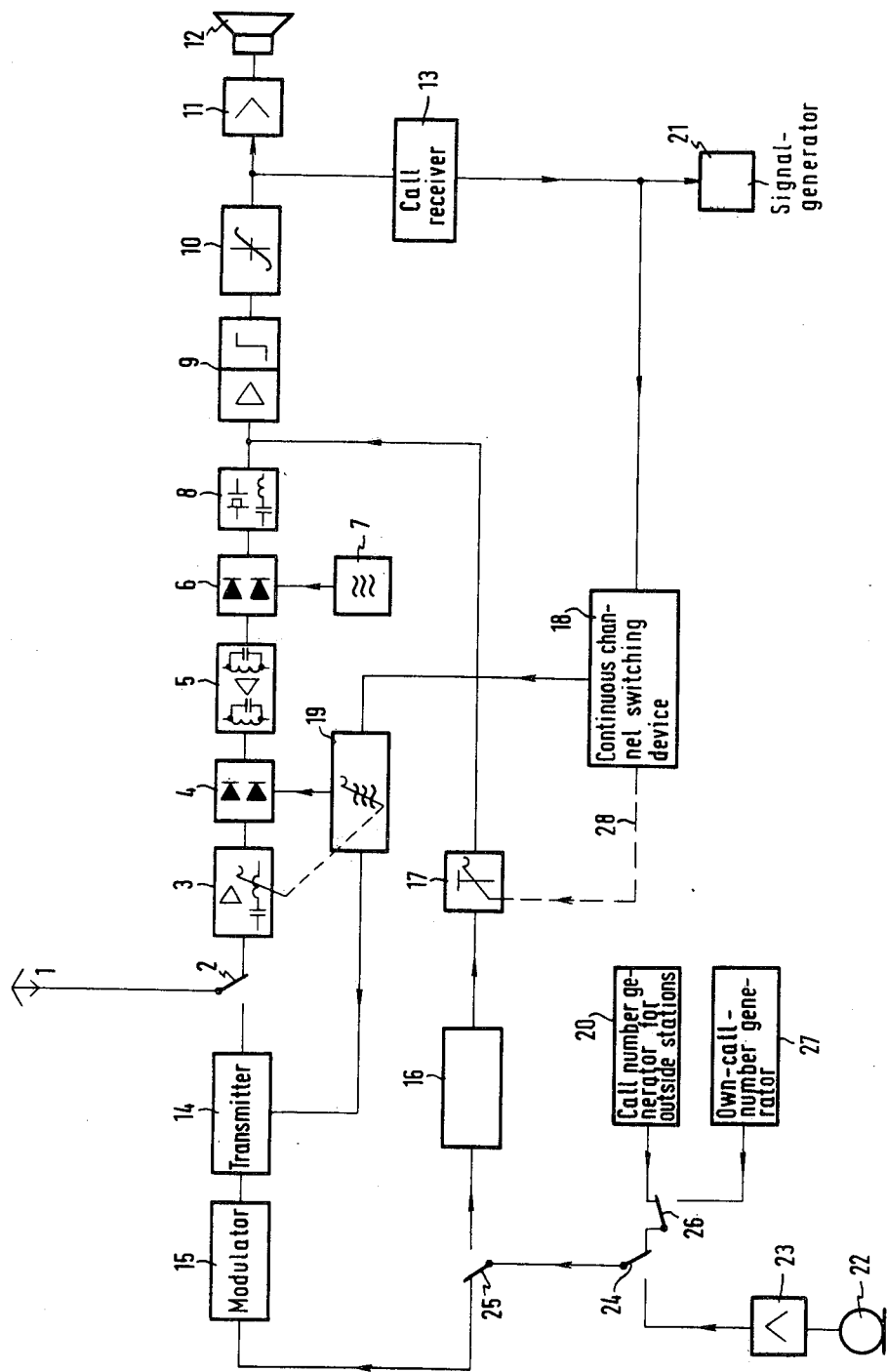

TRANSMITTER-RECEIVER EMPLOYING AUTOMATIC CHANNEL HUNTING AND SELECTION

This is a continuation of application Ser. No. 552,638 filed Feb. 24, 1975, now abandoned.

BACKGROUND OF THE INVENTION

1. Field of the Invention

The present invention relates to a transmitter-receiver for automatically establishing radio communications with other transmitter-receivers. The transmitter-receiver includes a preset selective call receiver, an adjustable selective call generator, and an oscillator adjustable to several channels, wherein, in the ready-to-receive condition, the channels are cyclically and sequentially connected until a call is determined, and wherein, for establishing a connection with another station, the channels are successively connected until an idle channel is found.

2. Description of the Prior Art

Such transmitter-receiver units are known (German Published Application 2,139,403). They are used in radio systems where, for optimum utilization of the radio channels in a frequency band, each user has access to each "idle" channel through an automatic channel finding circuit. In star-type radio networks, i.e. where traffic is handled via a central station, idle channels are identified by a special modulation. In meshed radio networks, i.e. with direct traffic between the users, identification of idle channels is impossible because there is no central station. If a station is ready to receive, its receiver cyclically searches all channels in the frequency band for signals which are intended for this station.

If, however, a party at one station wants to call another station, a preliminary check must be performed to find out which of the channels is idle. A channel is idle if the RF energy received on this channel does not exceed a predetermined threshold value. This means that the channel is not occupied by other stations of its own network nor by outside transmitters nor by interfering RF energy sources.

Under these latter conditions it can be expected that the called station will be received interference-free with a high probability. Since the location of the other station and, consequently, the radio-link losses are unknown, the receiver is operated with its maximum sensitivity. Therefore, the threshold above which the RF energy must lie in order that a channel can be considered "idle" is only slightly above the equivalent noise input of the receiver.

In the known transmitter-receiver units, "idle" testing is done by measuring the received field strength. The components needed for that purpose make such a receiver very expensive.

SUMMARY OF THE INVENTION

It is therefore an object of the invention to provide a transmitter-receiver in which no field-strength measurement is necessary for the "idle" testing of the radio channels.

In the novel receiver, "idle" testing of the radio channels is effected not by field-strength measurement, but by superposition of a test signal on the input signal converted to the intermediate-frequency range, thereby reliable location of an idle channel is possible. Costs of equipment in accordance with the present invention are low in comparison with units in which the channels are tested "idle" by measuring the field strength.

BRIEF DESCRIPTION OF THE DRAWING

The above mentioned and other features and objects of this invention and the manner of obtaining them will become more apparent, and the invention itself will be best understood by reference to the following description of an embodiment of the invention taken in conjunction with the accompanying drawings, in which:

The FIGURE shows a block diagram of an FM transmitter-receiver, according to the invention, for simplex operation.

DESCRIPTION OF A PREFERRED EMBODIMENT

In the block diagram, all contacts are shown in the ready-to-receive condition. The RF energy received by a transmit-receive antenna 1 is applied via a contact 2 of a transmit-receive switching relay (not shown) to a tunable RF pre-stage 3. The radio frequency is converted down to the 1st intermediate frequency in a first mixer 4 with the aid of a frequency supplied by an osicllator 19 adjustable to several frequencies and is amplified in a 1st intermediate-frequency unit 5. In a second mixer 6, this 1st intermediate frequency is then converted down to the 2nd intermediate frequency with the aid of the frequency provided by a fixed-frequency oscillator 7. The 2nd intermediate frequency is applied to a crystal filter 8 and from there to an amplifier-limiter 9. The latter is followed by a discriminator 10, whose output signal is applied, on the one hand, to an audio amplifier 11 and from there to a loudspeaker 12 and, on the other hand, to a selective call receiver 13.

The selective call receiver is adjusted to the tone sequence identifying this station, so it will apply voltage to a visual or audible signalling device 21 only if this tone sequence is recognized.

In the ready-to-receive condition illustrated in the block diagram, the adjustable oscillator 19 is cyclically advanced by a continuous channel switching device 18 in such a manner that all channels are connected in succession. Each channel remains connected as long as it is necessary for the evaluation of a selective call. If the selective call receiver 13 responds on one of the channels, i.e., the station is being called, the continuous channel switching device 18 is stopped because the output of the selective call receiver is connected to this device.

By operating a press-to-talk button (not shown), it is now possible to speak with the calling station. If the press-to-talk button is pressed, the transmit-receive relay pulls up, whereby the contact 2 changes over and connects the antenna 1 to the output of transmitter 14. The speech signals are applied from a microphone 22 via a microphone amplifier 23, another changeover contact 24 of the transmit-receive relay, a changeover contact 25 and a modulator 15 to the transmitter 14. The latter is simultaneously turned on by a further contact of the transmit-receive relay. During the search operation the oscillator 19 will have set the transmitter 14 to the same channel frequency as that of the receiver.

The components so far described — except for the changeover contact 25 — and their operation are well-known, as also is a call number generator 20 for outside stations.

Now will be described how a search is made, according to the invention, for an idle radio channel if an operator at the station wants to call another station.

To this end, the following additional components are provided: an own-call-number generator 27 which may be part of the call number generator 20 and with whose output signal a fixed frequency oscillator 16 is modulated which generates the same frequency as the 2nd intermediate frequency; an electronically adjustable attenuator 17 connected to the output of the oscillator 16; a changeover contact 25, and a changeover contact 26. At the junction of the components 8 and 9, the modulated signal appearing at the output of the attenuator 17 is injected into the 2nd intermediate frequency. The frequency modulation of the oscillator 16 is carried out so that the frequency deviation of the test signal is equal to that of the call signals of the other stations. With the attenuator the level of the test signal is adjusted to a value which is only slightly above the IF noise level at the point of injection. Then, behind the amplifier-limiter 9 and the demodulator 10, a signal suitable for the selective call receiver 13 is available if no signal is being received at the same time.

The test signal is injected if a channel search button (not shown) is operated which is coupled with the press-to-talk button. This channel search button causes the continuous channel switching device to be turned on, the changeover contacts 25 and 26 to change to the other position, and the own-call-number generator 27 and the oscillator 16 to be turned on.

Via the changeover contacts 25, 24, 26, the unit's own call number is now constantly applied as a modulating signal to the oscillator 16; the latter's output signal is applied via the attenuator 17 to the amplifier-limiter 9. At the same time, as in the ready-to-receive condition, the oscillator 19 is cyclically advanced.

If the antenna 1 receives RF energy on a channel, this energy is passed as usual to the RF and IF stages 3, 4, 5, 6 and 8 of the receiver. In the 2nd intermediate frequency the test signal is superposed on this RF energy. Above a predetermined amplitude of the received RF energy, the selective call receiver 13 can no longer evaluate the modulation of the test signal, i.e., the channel is not idle. In this case, the oscillator 19 is advanced to the next channel, where the "idle" test is repeated, etc.

If the test signal in a channel reaches the selective call receiver 13 undisturbed, so that the latter responds, the continuous channel switching device is stopped. This results in the oscillator 16 and the own-call-number generator 27 being turned off and the changeover contacts 25 and 26 returning to the positions shown. Now the transmit-receive relay is operated, and the call number generator for outside stations 20, into which the call number of the wanted party was entered, is turned on, so that this call number is transmitted. If the called party answers, he can be spoken with as described above.

In an improvement of the invention, following unsuccessful "idle" testing of all channels, the "idle" test is automatically repeated with a higher level of the test signal. To this end, the electronic attenuator 17 is adjusted by the continuous channel switching device 18 via the dashline connection 28.

The invention has been described in connection with a simplex set. However, the principle can also be applied to duplex sets.

The call generator 27 can also be adjusted so as to provide not the station's own call number, but a different call number which is not otherwise used. In this case, the selective call receiver 13 must be switched to this other call number during the search. This has the advantage that the channel search cannot be interrupted by an incoming call.

While the principles of the invention have been described above in connection with specific apparatus and applications, it is to be understood that this description is made only by way of example and not as a limitation on the scope of the invention.

I claim:

1. A channel hunting and selection system for a two-way transmitter-receiver combination of the type wherein the receiver operates over a selected one of a plurality of given RF channels, said receiver having a mixer for receiving RF signals and the output of a variable frequency local oscillator to provide a first IF signal output indicative of said channels, and said receiver having a demodulator for detecting the output of said mixer to provide the information bearing modulation signal of a modulated IF signal, said system comprising, in combination:

a second local oscillator for providing a second IF signal the frequency of which is substantially equal to the frequency of said first IF signal;

means for modulating said second IF signal with a given address signal;

means for coupling said modulated second IF signal with said first IF signal at the output of said mixer and at a predetermined level above the noise level of said first IF signal;

means coupled to the detected output of said receiver for detecting said given address signal and when the level of said second IF signal significantly exceeds the level of said first IF signal for providing an idle-channel output signal indicative thereof; and, means responsive to said idle-channel output signal for controlling said variable frequency local oscillator to a fixed frequency corresponding to a selected one of said given channels.

2. The system according to claim 1, wherein said means for coupling said modulated second IF signal comprises an attenuator.

3. The system according to claim 2, wherein said attenuator is adjustable for providing a range of detection thresholds.

4. The system according to claim 1, wherein said given address signal is the identification number of said transmitter-receiver combination.

5. The system according to claim 1, including means for sequencing the frequency of said variable frequency local oscillator through a range of frequencies corresponding to said plurality of given RF channels; and further including means for re-sequencing said variable frequency local oscillator through said range while increasing the level of said second IF signal when said means for detecting said given address signal fails to detect said given address signal.

* * * * *